(12) United States Patent
Mozingo

(10) Patent No.: US 7,784,558 B2
(45) Date of Patent: Aug. 31, 2010

(54) THREE POINT HITCH

(75) Inventor: Robert E. Mozingo, Burlington, IA (US)

(73) Assignee: CNH America LLC, New Holland, PA (US)

( * ) Notice: Subject to any disclaimer, the term of this patent is extended or adjusted under 35 U.S.C. 154(b) by 133 days.

(21) Appl. No.: 12/112,271

(22) Filed: Apr. 30, 2008

(65) Prior Publication Data

US 2009/0272550 A1    Nov. 5, 2009

(51) Int. Cl.
*A01B 51/00* (2006.01)
(52) U.S. Cl. .................................. 172/272; 172/439
(58) Field of Classification Search ............. 172/1, 172/272, 439–451, 677–680, 273, 275; 280/186, 280/477, 478.1, 479.1, 482, 491.1, 491.2; 37/417, 435
See application file for complete search history.

(56) References Cited

U.S. PATENT DOCUMENTS

| | | | |
|---|---|---|---|
| 3,201,878 A | 8/1965 | Markwardt | |
| 3,384,937 A | 5/1968 | Muncke et al. | |
| 3,432,184 A | * 3/1969 | Tweedy ................ | 172/272 |
| 4,125,271 A | 11/1978 | Wiboltt et al. | |
| 4,221,399 A | 9/1980 | Berg | |
| 4,268,057 A | 5/1981 | Engelmann et al. | |
| 4,360,216 A | * 11/1982 | Wiemers ............. | 280/479.1 |
| 4,712,622 A | 12/1987 | Birkenbach et al. | |
| 4,862,971 A | 9/1989 | Azzarello et al. | |
| 4,892,158 A | 1/1990 | Brown et al. | |
| 5,143,159 A | 9/1992 | Young et al. | |
| 5,152,357 A | 10/1992 | McLean et al. | |
| 5,190,111 A | 3/1993 | Young et al. | |
| 5,320,186 A | 6/1994 | Strosser et al. | |
| 5,327,978 A | 7/1994 | Bremner | |
| 5,394,948 A | 3/1995 | Bunnell | |
| 5,421,416 A | 6/1995 | Orbach et al. | |
| 5,480,276 A | 1/1996 | Mozingo | |
| 5,601,146 A | 2/1997 | Schlegel et al. | |
| 5,682,954 A | 11/1997 | Burns | |
| 5,995,895 A | 11/1999 | Watt et al. | |
| 5,997,024 A | 12/1999 | Cowley | |
| 6,076,612 A | 6/2000 | Carr et al. | |

(Continued)

FOREIGN PATENT DOCUMENTS

GB    2 218 890 A    11/1989

(Continued)

*Primary Examiner*—Robert E Pezzuto
(74) *Attorney, Agent, or Firm*—Patrick M. Sheldrake; John William Stader; Michael G. Harms

(57) ABSTRACT

A three point hitch for a work vehicle is provided with one draft link of fixed length and another draft link of variable length. The variable length draft link includes a linear double action hydraulic cylinder assembly, a first attachment plate fixedly connected with one of the arm and the cylinder of the assembly and having a pivot connector configured for pivotal attachment with the vehicle, and a second attachment plate fixedly connected with a remaining one of the arm and the cylinder and having a first pivot connector configured for pivotal attachment with a tilt link and a second pivot connector configured for pivotal attachment with the implement to be supported from the vehicle. The variable length draft link permits lateral adjustment of the angle of the implement with respect to the vehicle center line.

17 Claims, 5 Drawing Sheets

U.S. PATENT DOCUMENTS

| | | |
|---|---|---|
| 6,149,180 A | 11/2000 | Haws |
| 6,227,304 B1 | 5/2001 | Schlegel |
| 6,250,396 B1 * | 6/2001 | Gengler et al. ................ 172/7 |
| 6,276,462 B1 | 8/2001 | Dietrich, Sr. |
| 6,321,851 B1 * | 11/2001 | Weiss et al. ................ 172/444 |
| 6,401,517 B1 | 6/2002 | Mowatt et al. |
| 6,547,012 B2 | 4/2003 | Scarlett et al. |
| 6,688,403 B2 | 2/2004 | Bernhardt et al. |
| 6,769,496 B2 | 8/2004 | Casali et al. |
| 6,830,112 B2 | 12/2004 | Pierce |
| 6,966,388 B1 | 11/2005 | Harnetiaux et al. |
| 7,073,603 B2 * | 7/2006 | Nordhoff ................ 172/272 |
| 7,237,496 B2 | 7/2007 | Bettin et al. |
| 7,264,079 B2 | 9/2007 | Bordini et al. |

FOREIGN PATENT DOCUMENTS

| | | |
|---|---|---|
| JP | 2003299402 A | 10/2003 |

* cited by examiner

THREE POINT HITCH

BACKGROUND OF THE INVENTION

The present invention relates to hitch assemblies, in particular, three-point hitch assemblies, utilized in work vehicles, such as industrial and farm tractors.

Three point hitches are used by a variety of work vehicles such as tractors to attach a load such as an implement to the work vehicle and to position the load relative to the work vehicle. Three point hitches generally include two spaced lower links and an upper link above and between the two lower links. Each of the upper link and lower links has an end configured for engaging with and attaching the implement to the work vehicle. To lift the implement, the three point hitch generally includes one or more hydraulic cylinders, which directly or indirectly pivot the lower links to lower and raise those links and the load. As the load is raised and lowered, the upper link stabilizes the implement and helps maintain the implement in a desired orientation relative to the work vehicle. To pitch the implement about a horizontal, transverse axis, the upper link is made adjustable, commonly by the use of a hydraulic cylinder as or in the link.

Three point hitches are either rear or front mounted. Rear-mounted three point hitches secure the implement to the rear of the vehicle, most commonly to be pulled by the vehicle. However, rear hitches can be used to push implements and other loads in reverse. It is relatively common for tractor operators to mount a rear facing scraper or blade so as to push material in a rearward direction in order to better see the implement working the material. Scrapers would normally only be pushed rearward while blades are pulled forward and pushed rearward.

Conventional three point hitches only provide two angular adjustments of the implement with respect to the vehicle, a pitch adjustment with respect to a transverse horizontal axis and a tilt or roll adjustment about a horizontal longitudinal axis. It would be beneficial to provide a simply modified, three point hitch having a third angular adjustment with respect to a vertical axis to enable the angle of the implement to be changed with respect to the vehicle.

BRIEF SUMMARY OF THE INVENTION

In one aspect the invention is an adjustable draft link for a three point hitch for a work vehicle comprising: a linear double action hydraulic cylinder assembly including a cylinder and a piston arm extending outwardly from within the cylinder; a first attachment plate fixedly connected with one of the arm and the cylinder, the first attachment plate including a pivot connector configured for pivotal attachment with a work vehicle; and a second attachment plate fixedly connected with a remaining one of the arm and the cylinder, the second attachment plate including a first pivot connector configured for pivotal attachment with a tilt link and a second pivot connector configured for pivotal attachment with a load to be moved by the work vehicle.

In another aspect, the invention is a set of draft links including the adjustable draft link and a draft link of fixed length to use with the adjustable draft link.

In yet another aspect, the invention is a three point hitch including a first draft link of adjustable length and a second draft link of fixed length.

In yet another aspect, the invention is a three point hitch adapted for adjustably coupling a load with a work vehicle comprising: an upper link configured for pivotal connection between the vehicle and the load; a first draft link of adjustable length located below the upper link on a first lateral side of the upper link and having a pivot connector at a first end configured for pivotal connection with the vehicle and a second pivot connector at a second end configured for pivotal connection the load; and a second draft link of fixed length located below the upper link on a second lateral side of the upper link opposite the first lateral side and having a pivot connector at a first end configured for pivotal connection with the vehicle and a second pivot connector at a second end configured for pivotal connection with the load.

In yet another aspect, the invention is an improvement in a three point hitch including an upper link, a first draft link below and to one lateral side of the upper link and a second draft link below and to an another lateral side of the upper link opposite the one lateral side. The improvement is the first draft link being of adjustable length and the second draft link being of fixed length.

In yet another aspect, the invention is a method of improving the versatility of a three point hitch adapted for adjustably coupling a load with a work vehicle, the three point hitch including an upper link configured for pivotal connection between the vehicle and the load, comprising the steps of: providing a first draft link of adjustable length below the upper link on a first lateral side of the upper link and having a pivot connector at a first end configured for pivotal connection with the vehicle and a second pivot connector at a second end configured for pivotal connection the load; and providing a second draft link of fixed length below the upper link on a second lateral side of the upper link opposite the first lateral side and having a pivot connector at a first end configured for pivotal connection with the vehicle and a second pivot connector at a second end configured for pivotal connection the load.

DETAILED DESCRIPTION OF THE INVENTION

Figure 1:
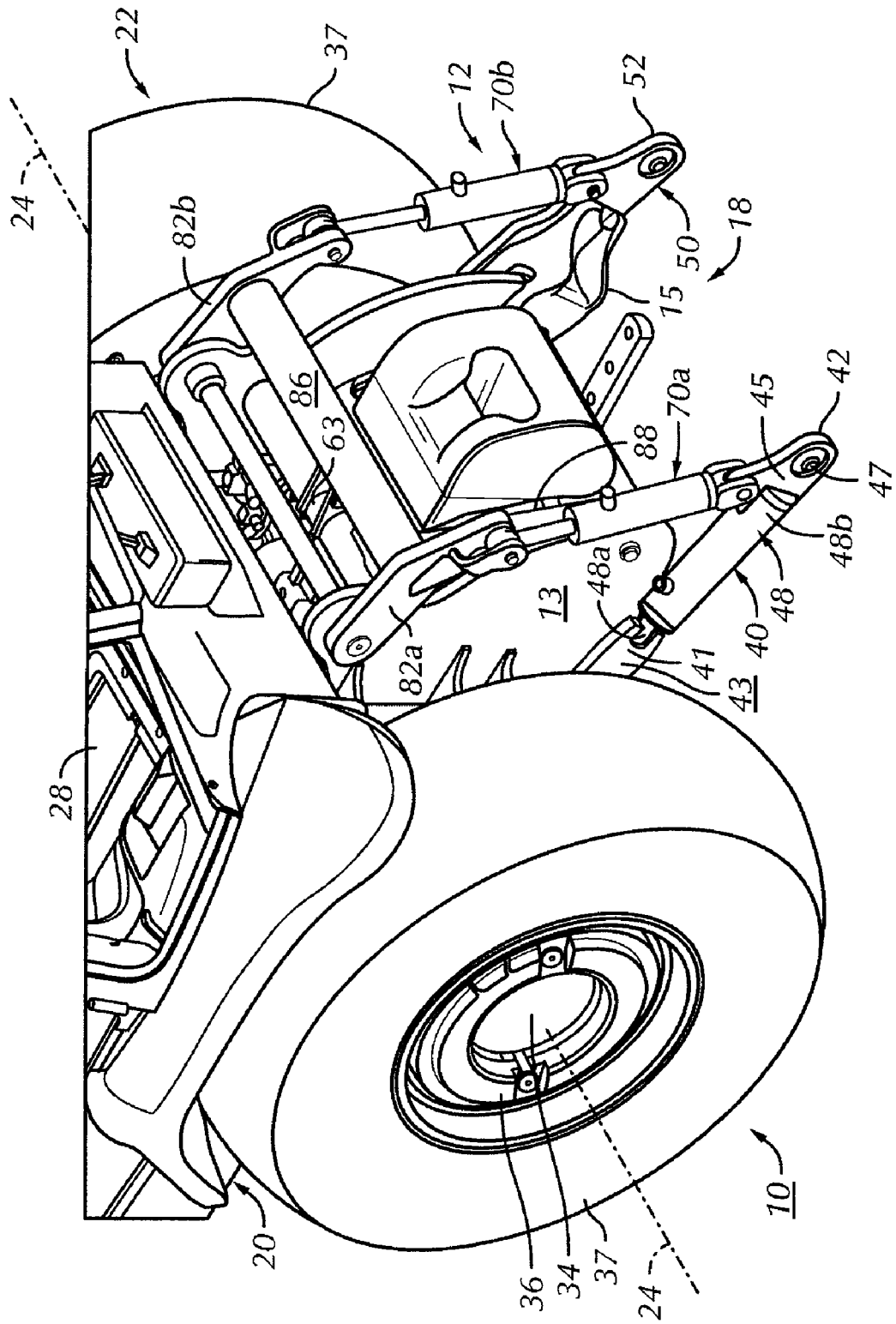
FIG. 1 is a partial perspective view of a rear end of a tractor mounting a three point hitch of the present invention.
Figure 6:
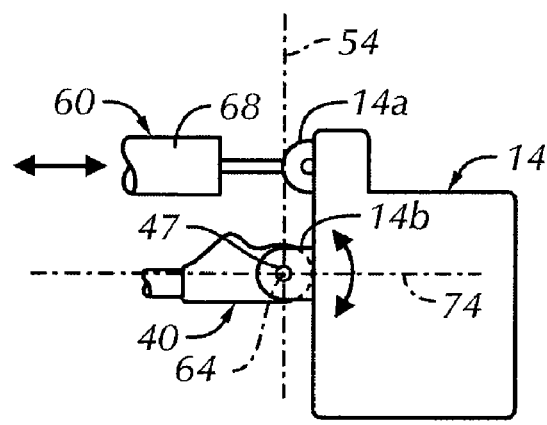
FIG. 6 depicts diagrammatically in side elevation, conventional pitch movement of implement.
Figure 7:
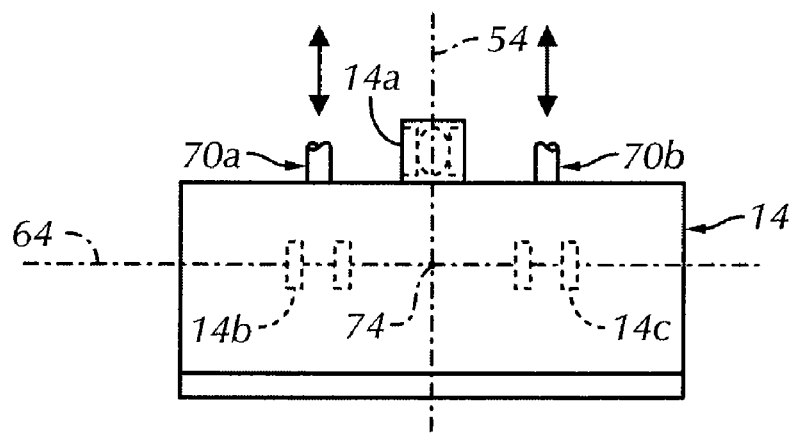
FIG. 7 depicts diagrammatically in rear elevation, conventional tilt movement of the implement.
Figure 8:
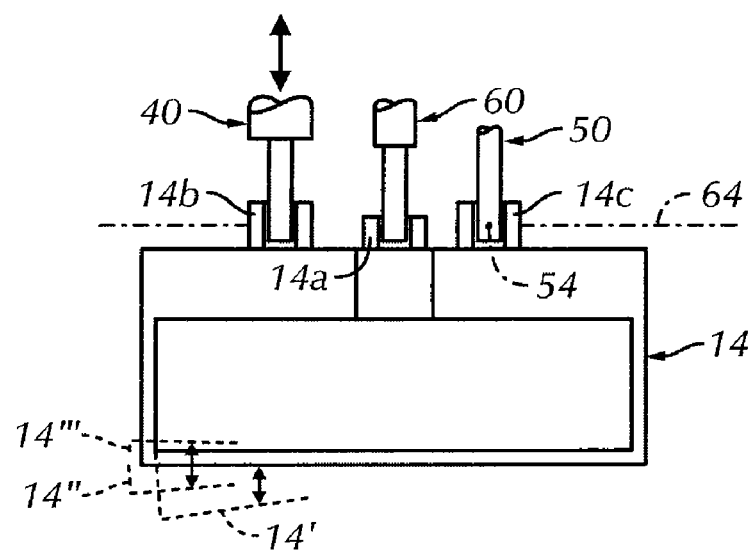
FIG. 8 depicts diagrammatically in top plan, angular movement of the implement provided by the three point hitch of the present invention.

FIG. 1 is a perspective view of a rear end portion of a work vehicle indicated generally at 10 including a rear-mounted, three-point hitch embodiment of the present invention indicated generally at 12, which is adapted for adjustably coupling a load, preferably an implement 14 indicated diagrammatically in FIGS. 6-8, with a rear end 18 of the vehicle 10. Work vehicle 10 preferably is a conventional tractor such as a farm tractor (depicted) or construction tractor (not depicted) having a chassis 26 extending in a longitudinal direction between a front end (not depicted) and a rear end 18 and transversely between a left or first lateral side 20 and an opposing right or second lateral side 22. Chassis 26 generally includes a front axle supporting front wheels (none depicted) and rear axle (an end of which is indicated at 34 in FIG. 1) supporting rear wheels 36 in a conventional manner. Chassis 26 supports operator station partially depicted and indicated generally 38 at the rear end 15, as well as the internal components of work vehicle 10 including its engine, transmission and hydraulic system (none shown). Work vehicle 10 may be wheeled with tires 37 as depicted or tracks (not depicted).

Figure 2:
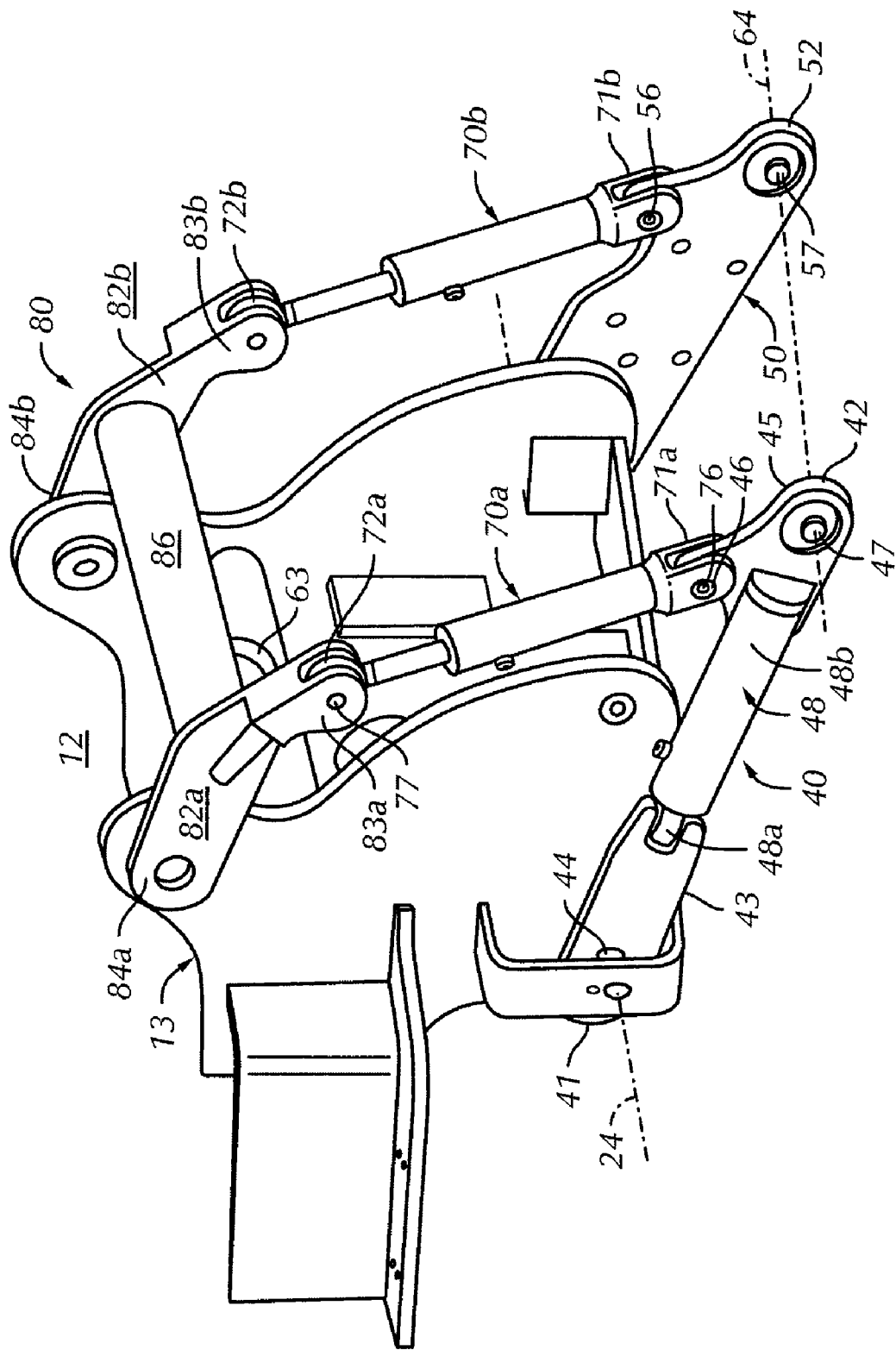
FIG. 2 is a rear perspective view of the three point hitch of FIG. 1 with an adjustable draft arm at minimum extension and a rocker shaft fully lifted.

FIG. 2 also depicts the rear mounted, three-point hitch 12 but without work vehicle 10. Three-point hitch 12 generally includes an upper link 60 sometimes called a "top" or "pitch" or "center" link, and below the upper link 60, on first and second opposing lateral sides of the upper link 60, first and second lower or "draft" links 40, 50, respectively. According to an important aspect of the invention, first draft link 40 is an adjustable link of variable length while second draft link 50 is of fixed length. Draft links 40, 50 are configured at their first longitudinal ends (41, 51) for pivotal connection with work vehicle 10 to rotate about a common axis 24, which extends horizontally and transversely between lateral sides 20, 22 of work vehicle 10. Draft links 40, 50 extend rearward from axis 24 and include second longitudinal ends indicated generally at 42, 52, respectively, configured for pivotal connection with implement 14 or another load.

A pair of tilt cylinders 70 of adjustable length are preferably provided to raise and lower the draft links 40, 50 and any connected implement 14 or other load. First tilt link 70a is pivotally coupled at a first longitudinal end 71a with the second longitudinal end 42 of the first draft link 40. Second tilt link 70b of adjustable length is pivotally coupled at a first longitudinal end 71b with the second longitudinal end 52 of the second draft link 50. More particularly, each tilt link 70 is individually adjustable in length in order to selectively raise or lower each draft link 40, 50 and the connected implement 14, in order to pivot or tilt the implement 14 about an axis 74 extending in an at least generally longitudinal direction through the vehicle 10 and through the hitch 12 between the first and second draft links 40, 50. For simplicity, the first and second tilt cylinders 70a, 70 are preferably identical, but they need not be.

Preferably, the pair of tilt cylinders 70 are further pivotally supported by a rocker assembly indicated generally at 80 including a pair of preferably identical rocker arms 82. More particularly, the second longitudinal end 72a of the first tilt link 70a is pivotally connected with a first longitudinal end 83a of a first rocker arm 82a while the second longitudinal end 72b of the second tilt link 70b is pivotally connected with a first longitudinal end 83b second rocker arm 82b. Second longitudinal ends 84a, 84b of rocker arms 82a, 82b are pivotally connected with the vehicle 10. Rocker arms 82 are fixedly connected to and are connected together by a rocker shaft 86 extending transversely across the rear end 18 of the vehicle 10 over the upper link 60. A rocker link 88 of adjustable length is further pivotally connected at its longitudinal ends between the rocker shaft 86 and the vehicle 10 so as to selectively raise and lower the shaft 86 and pivot the rocker arms 82 to raise and lower the tilt cylinders 70 and draft links 40, 50 and any implement 14 connected to the draft links.

All of the adjustable links 40, 60, 70 and 88 are preferably provided by linear, double acting hydraulic cylinder assemblies for individual, selective and remote adjustment of their lengths by an operator seated in the station 38. Hydraulic cylinder assemblies for links 60, 70 and 88 are conventional as is second draft link 50 and rocker assembly 80.

Figure 5:
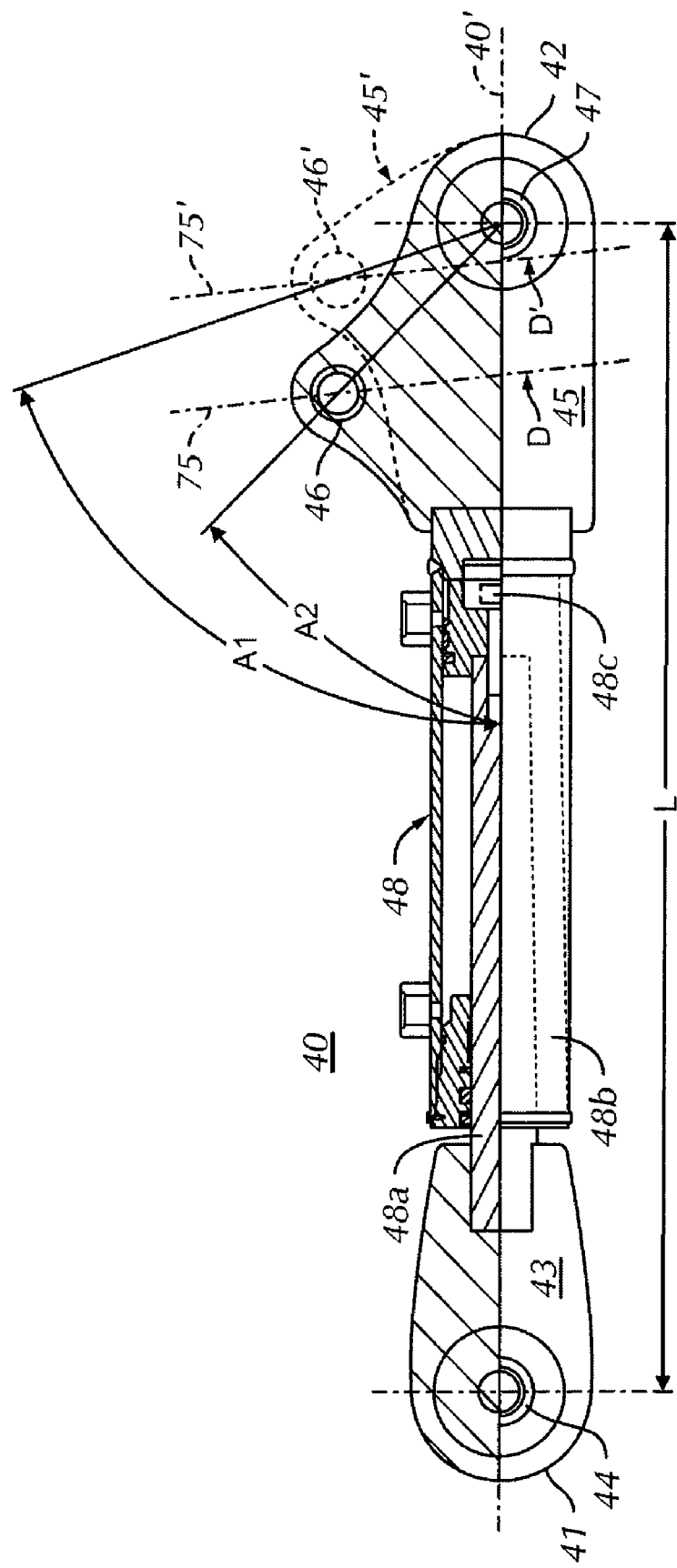
FIG. 5 is a quarter section elevation view of an adjustable draft link of the present invention, at minimum extension.

A first exemplary adjustable draft link 40, is shown in detail in quarter section in FIG. 5 and is unique to the present invention. First adjustable draft link 40 is preferably provided by a linear, double acting, hydraulic cylinder assembly 48 with mounting plates 43, 45 at its opposing first and second ends 41, 42, respectively. Hydraulic cylinder assembly 48 is sufficiently robust to sustain the loads expected to be imposed on the fixed length, second draft link 50. In this embodiment, the piston arm 48a of the assembly 48 is fixedly connected with a first, "vehicle attachment" plate 43, which forms the first end 41 of first draft link 40 and is configured for conventional pivotal connection with the vehicle 10 by the provision of a pivot connector 44, like a bushing or bearing or, more preferably, a ball joint. First plate 43 is preferably identical to or essentially matches the first end 51 of second draft link 50. In this embodiment, the elongated hydraulic cylinder 48a of assembly 48 is fixedly connected with a second, "implement attachment" plate 45, which forms the second end 42 of first draft link 40 and is configured for conventional pivotal connection with the first tilt link 70a and with the implement 14. Implement attachment plate 45 may be identical to or essentially match the second end 52 of second draft link 50 but need not be for reasons that will be explained. Implement attachment plate 45 includes a first pivot connector 46, preferably a bushing or bearing configured for pivotal connection with the first end 71a of the first tilt link 70a. It is further provided with a second pivot connector 47, preferably a universal joint, configured for pivotal connection with the implement 14.

FIGS. 1-3 and 5 depict the first adjustable draft link 40 in a "fully retracted" or "closed" or minimum length condition with piston arm 48a as fully retracted into cylinder 48b as is possible. Preferably the minimum or "fully retracted" or "closed" length L (with cylinder assembly 48 fully retracted) of adjustable draft link 40 between its vehicle and implement pivot connectors (e.g. ball joints) 44 and 47 is equal to the length between the corresponding pivot connector of second, fixed length draft link 50. By providing an equal length, all the operator has to do is fully retract the piston of the assembly 48 to the minimum Length L to assure that the implement 14 is square to the vehicle 10. That is, an axis through the implement pivot connectors 47, 57 with the tilt cylinders 70 adjusted to the same length and height, will be perpendicular to a central longitudinal vertical plane of the vehicle 10. For a class 3 size work vehicle, the stroke length of the piston, which is also the adjustment length of the link 50, can be up to a foot (300 mm.) or more. The stroke or adjustment length is suggestedly at least about six inch (150 mm.) in order to develop enough of an angle change between the implement 14 and vehicle 10 to be useful in moving material to the side of the vehicle 10 and, more preferably, about eight inches (about 200 mm) or more.

It should be noted that adjustable draft links could be provided on both sides of the hitch to adjust the implement angle with respect to the vehicle center line in either direction. However, that would prevent the provision of a caliper 15 (in FIG. 1), a device which limits lateral movement of the second draft bar 50 and through it, lateral movement of the implement 14 or other load being pushed or pulled. Alternatively, the present invention with one adjustable draft link 40 might have a minimum, "closed" or "fully retracted" length between its pivot connectors (e.g. ball joints) 44 and 47 that is less than the length between the corresponding pivot connectors 54, 57 at the first and second ends of second draft link 50, by about one half the stroke length of the piston arm 48b, so that the second end 42 of the adjustable first draft link 40 (and any implement 14 attached to that link) can be drawn closer to or pushed farther from the work vehicle 10 than the second end 52 of the second link 50 (and any implement attached to that link) is positioned. This would enable the angle of the implement to be adjusted in either direction with respect to the central axis 11. However, this would require a sensor of some type to signal the operator when the length of the adjustable draft link was the same as that of the fixed length draft link in order to square the implement 14 to the vehicle 12 when squaring is necessary, or the operator would simply have to eyeball the center position.

Figure 3:
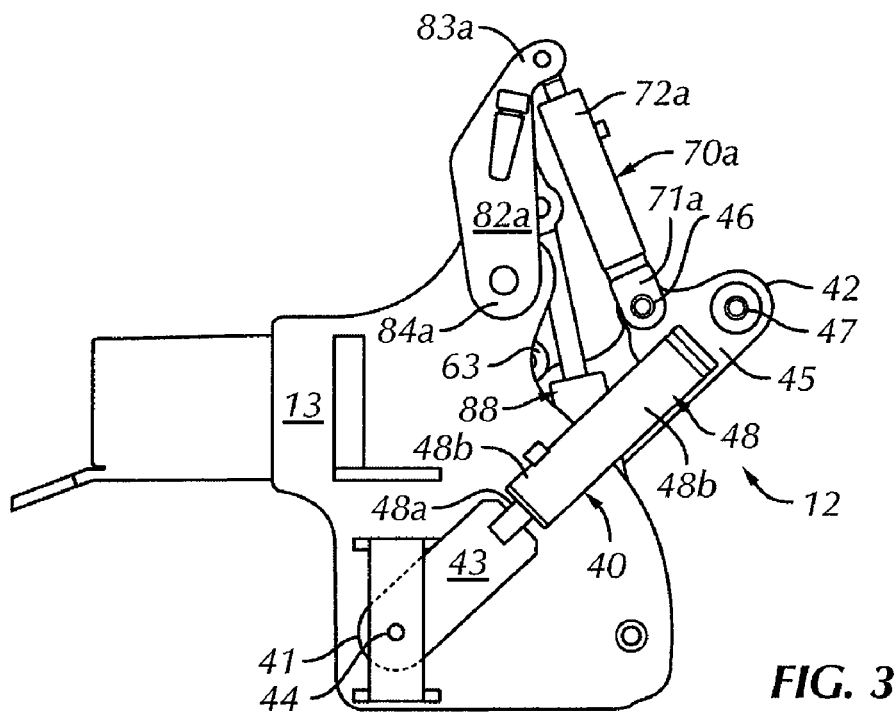
FIG. 3 is a side elevation view of the hitch in the position shown in FIG. 2.
Figure 4:
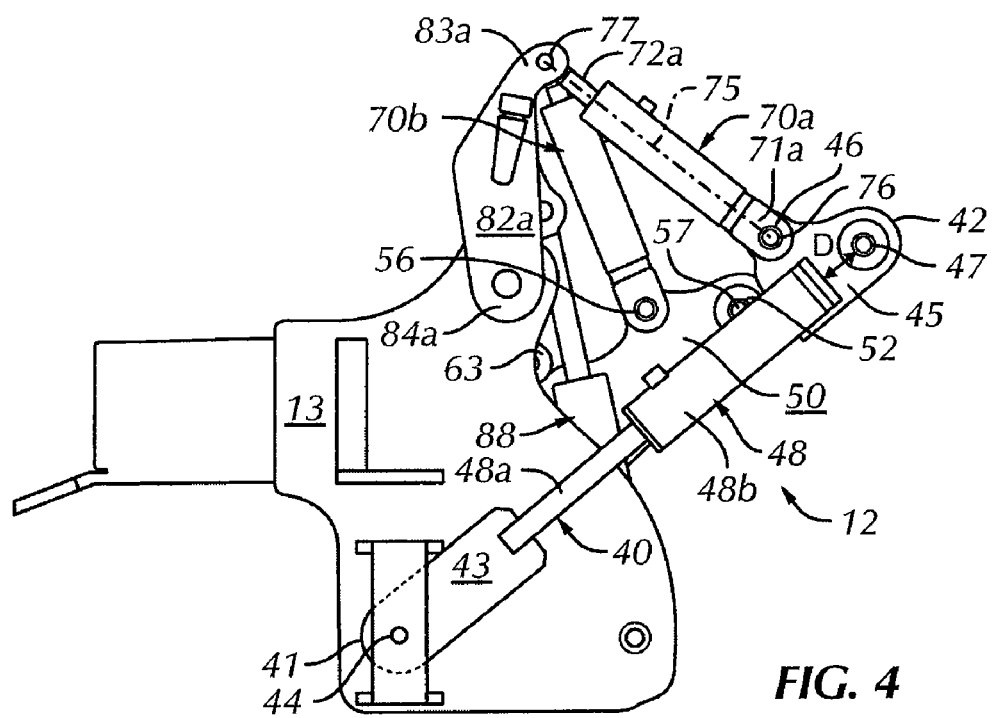
FIG. 4 is a side elevation view of the hitch with the adjustable draft arm at full extension; and a rocker shaft fully lifted.

FIGS. 2-4 illustrate rear-mounted three-point hitch 12 in greater detail. FIG. 2 is a perspective view of the hitch 12 without vehicle 10 or load 14 while FIGS. 3 and 4 are side elevations of the hitch 12 with the draft arms 40, 50 and rocker assembly 80 in different elevated positions. FIG. 2 depicts tilt adjustment of the hitch 12. Rocker assembly 80 is in the full down position as is second draft arm 50 with the hydraulic assembly of second tilt link 70b fully extended. The first draft link 40 is fully retracted but the first tilt link 70a is only partially extended, meaning the location of the second pivot (implement) connector 47 of the first draft arm 40 is higher than connector 57 of the second draft arm 50, tilting the left lateral side of the implement 14 higher than the right side is. FIG. 3 depicts the fully raised position of the hitch 12. The rocker assembly 80 is fully raised, with the tilt cylinders 70 and the first adjustable draft link 40 fully retracted. FIG. 4 is a side elevation that illustrates what is believed to be the maximum loading on the first adjustable draft link 40. It differs from FIG. 3 in that the first adjustable draft link 40 is at full extension.

It should further be appreciated that extending the first adjustable draft link 40 any amount in any position of the link 40, without changing the length of the connected tilt link 70a, will raise the second, (implement coupling) pivot connector 47 above the comparable pivot connector 57 of the second, fixed draft link. Obviously, this difference in height is proportional to the amount that the first adjustable link arm 40 is extended and can be great enough at full extension to cause a noticeable tilt in the implement. Accordingly, the second tilt link length needs to be adjusted to counter changes in adjustable draft link length to keep the implement plumb level with the rear axle 34 and rear wheels 36 of the vehicle 10. While identical tilt cylinders are preferred for simplicity, the invention also includes the provision of a first tilt link having a stroke length greater than the stroke length of the second tilt link in order to take full advantage of the adjustable length of the first draft link 40. Again, the minimum length of the first tilt link would preferably equal the minimum length of the second tilt link for ease of operation.

FIGS. 1-4 show the connections of all of the elements of the hitch 12 with respect to one another and the vehicle 10 but FIG. 5 depicts in solid, the second end 42 of the first draft link 40 depicted in FIGS. 1-4 and, in phantom, an alternative, optimum configuration of the second, implement mounting bracket indicated at 45' on the first adjustable draft link 40. Since the first draft link 40 is being provided by a hydraulic cylinder assembly 48 instead of a solid member, it cannot sustain bending loading as can a solid member forming the second, fixed length draft link 50. Bending stress on the cylinder assembly 48 can bend the rod 48a and/or distort the seal of piston 48c. In order to reduce the bending moment on the hydraulic cylinder assembly 48, the first (tilt) pivot connector 46 should be located as close to the second (implement) pivot connector 47, as possible so that the force vector generated by the tilt link 70a on the first draft link 40 passes through or as close to the center of the second (implement) pivot connector 47, as possible in order to minimize the moment arm, distance "D". The force vector from the tilt link cylinder 70a on the first (adjustable) draft link 40 is essentially co-linear with the central longitudinal axis 75 extending between the pivot connectors (bearings) 76, 77 of the first tilt link 70a (see FIG. 4). Ideally, the central longitudinal axis 75 of tilt link 70a should pass through the center of the second (implement) pivot connector 47 of the first draft link 40 with the first draft link 40 in its elevated position with the rocker assembly 80 at full height and the tilt link 70a as fully retracted as the first draft link 40 permits it to be to retracted. This would eliminate any torque or bending moment on the second bracket 45 and the hydraulic cylinder assembly 48. However, interferences between different components of the hitch 12 may limit alignment of the first pivot connector 46 and the tilt link force vector/central axis 75 with the center of the second pivot connector 47. Nevertheless, the first pivot connector 46 coupled with the tilt link 70a should be located such that the central axis 75 of the tilt link 70a passes as close to the center of the second pivot connector 47 as hitch component dimensions will permit so that the perpendicular distance "D" from the axis 75 to the pivot 47 is as small as possible. This relocation of the first pivot connector is indicated in phantom at 46' in FIG. 5 with the resulting tilt cylinder axis 75' and distance D'.

It should further be noted from FIG. 5 that the three pivot connectors 44, 46' and 47 of the first draft link 40 define a first angle A1 centered at the second pivot connector 47 at the second end 42 and that the three pivot connectors 44, 46 and 47 of the first draft link 40 define a second angle A2 also centered at the second pivot connector 47 at the second end 42. By moving the first pivot connector 46 to the closer position 46', the resulting angle A1 is different from the angle A2 formed with pivot connector 46. It is larger. Viewed another way, the second (implement) pivot connector 47 is located along the central longitudinal axis 40' of the first draft link 40 so as to minimize the distance between it and the central longitudinal axis 75 of the first tilt link 70a coupled with the first draft link 40. Again, the first draft link 40 with pivot connectors 44, 46' 47 could be used with a second draft link 50 having three pivot connectors positioned exactly like pivot connectors 44, 46 and 47 whereby the second ends 42, 52 of the two draft links 40, 50 are different in at least that respect. This might occur with a retrofit of an adjustable draft link for one of fixed length in an existing three point hitch.

Hitch 12 is particularly useful where the implement 14 is a blade to be used for material movement or a scraper for grading. FIGS. 6-8 illustrate diagrammatically the three degrees of rotational movement provided by the hitch 14. FIG. 6 is a side elevation that illustrates conventional pitch control of the implement 14 through the upper adjustable link 60, which is provided by a linear acting, hydraulic pitch cylinder 68. Link 60 with pitch cylinder 68 rotates the implement 14 about a transverse pitch axis 64 (best seen in FIGS. 7 and 8) extending through the second pivot connectors 47, 57 of the draft links 40, 50. FIG. 7 is a rear elevation view looking through the implement 14 toward the hitch 12 and vehicle 10 and illustrates conventional tilt (roll) control of the implement 14 by the hitch 12 through the adjustable tilt cylinders 70a, 70b. Tilt cylinders 70a, 70b pivot the implement 14 about a tilt (or roll) axis 74 (best seen in FIGS. 6 and 8), that is centered between the draft links 40, 50, perpendicular to pitch axis 64 and passing through generally the common axis 24 between the vehicle ends of the draft links. Finally, FIG. 8 illustrates the two possible forms of angle (yaw) control uniquely provided by the present invention. Adjustable draft link 40 pivots the implement 14 about an axis 54 that is at least generally vertical, passing through the second, (implement) pivot connector 57 of the second draft link 50 and perpendicular to the pitch axis 64. The square position of the implement 14 to the vehicle 10 is indicated in solid. The preferred maximum angle adjustment position is indicated in phantom at 14' while the alternate embodiment positions are indicated in phantom at 14" and 14'". Being able to adjust the angle of an implement 14 like a blade enables the vehicle 10 to move material in line with the vehicle 10, to one side of the vehicle. A conventional, three point hitch would position a blade square to the rear end 18 of the work vehicle 10. This means that when the vehicle is used in certain operations like as trench digging, the vehicle would have to be moved back and forth many times to move the material taken from the trench back into the trench. Hitch 12 should also be useful with other farm and construction attachments including but not limited to roto tillers, mowers and rakes.

It is understood, therefore, that changes could be made to the preferred embodiments of the three point hitch described above without departing from the broad inventive concept thereof. For example, instead of the preferred, double action, hydraulic cylinder assembly described, alternate means, such as telescoping tubing, could be provided in an adjustable draft link, which could be varied in length in various ways and retained in extended or retracted position in various ways. The telescoping tubing would be retained in fully or extended or retracted position by use of a hydraulic actuated pin which would fit in the inner and outer extension tube holes. Extending and retracting the mechanical draft arm would be accomplished by moving the unit forward or backward with the scraper blade or other load on the ground with the hydraulic piston pin retracted. The hydraulic piston pin would then be extended hydraulically into the extension tube holes when the draft arm is in the position the operator desired. Alternatively, operators could also manually install a pin stop in the extension tube holes after shutting the engine off and exiting the cab or operators compartment. Also other devices and methods can be to extend and retract the draft arm other than a hydraulic cylinder, for example, by the provision of a screw jack.

It is further understood, therefore, that this invention is not limited to the particular embodiments disclosed, but is intended to cover modifications within the spirit and scope of the present invention.

What is claimed is:

1. An adjustable draft link for a three point hitch for a work vehicle comprising:
   a linear double action hydraulic cylinder assembly including a cylinder and a piston arm extending outwardly from within the cylinder;
   a first attachment plate fixedly connected with one of the arm and the cylinder, the first attachment plate including a vehicle pivot connector configured for pivotal attachment with the work vehicle; and
   a second attachment plate mounted to a remaining one of the arm and the cylinder, the second attachment plate including a first pivot connector configured for pivotal attachment with a tilt link and a second pivot connector configured for pivotal attachment with a load supported from the work vehicle by the link.

2. The adjustable draft link of claim 1 wherein at least the pivot connector of the first attachment plate and the second pivot connector of the second attachment plate are ball joints.

3. The adjustable draft link of claim 2 wherein the first pivot connector of the second attachment plate is either a bushing or a bearing.

4. The adjustable draft link of claim 1 having an adjustment range of between one-half and one foot.

5. The adjustable draft link of claim 1 as a first draft link in combination with a second draft link having a draft link plate of fixed length as a set, the second draft link plate including a first end with a first ball joint pivot connector configured for pivotal attachment with the work vehicle and a second end with a second ball joint pivot connector configured for pivotal attachment with the implement attached with the adjustable draft link, wherein a vertical axis extending through the first ball joint forms the yaw pivot axis for attached implements.

6. The combination of claim 5 wherein:
   the second draft link has a length L between the first and second ball joint pivot connectors; and
   the first draft link has the length L between the ball joint pivot connectors at the first and second ends of the first draft link with the hydraulic cylinder assembly in a fully retracted condition wherein the second draft link includes a first pivot connector at the second end configured for pivotal attachment with a tilt link.

7. The combination of claim 6 wherein the second draft link includes a caliper for preventing lateral motion of the second draft link with respect to the first draft link.

8. The combination of claim 6 wherein in a first position where the cylinder is not extended, a first extension line drawn through the centers of the vehicle pivot connector and the second pivot connecter and between the center of the first pivot connector and the second pivot connector of the adjustable draft link centered at the second pivot connector at the second end define a first angle A1 between the extension lines and wherein similar extension lines through the three pivot connectors of the second draft link define a second angle A2 centered at the second pivot connector at the second end of the second draft link different from the first angle.

9. A three point hitch adapted for adjustably coupling a load with a work vehicle comprising:
   an upper rocker assembly having an upper link and cylinder configured for pivotal connection between the vehicle and the load;
   a first draft link of adjustable length located below the upper link on a first lateral side of the upper link and having a pivot connector at a first end configured for pivotal connection with the vehicle through a first tilt link connected to the first lateral side of the upper link and a second pivot connector at a second end configured for pivotal connection the load; and
   a second draft link of fixed length formed from a solid member having a higher bending strength than the first draft linkand located below the upper link on a second lateral side of the upper link opposite the first lateral side and having a pivot connector at a first end configured for pivotal connection with the vehicle through a second tilt link connected to the second lateral side of the upper link and a second pivot connector at a second end configured for pivotal connection with the load.

10. The three point hitch of claim 9 wherein the first draft link comprises:
   a linear double action hydraulic cylinder assembly including a cylinder and a piston arm extending outwardly from within the cylinder;
   a first attachment plate fixedly connected with one of the arm and the cylinder and forming the first end of the first draft link, the first attachment plate including the a pivot connector configured for pivotal attachment with a work vehicle; and a second attachment plate mounted to a remaining one of the arm and the cylinder and forming the second end of the first draft link, the second attachment plate including the second pivot connector configured for pivotal attachment with the load.

11. The three point hitch of claim 9 wherein a central longitudinal axis of the first tilt link passes through or generally adjacent to the center of the second pivot connector of the first draft link with the first draft link in a elevated position with the upper draft link at full height and the first tilt link as fully retracted as the adjustable draft link permits.

12. The three point hitch of claim 10 further comprising:
the pivot connector at the first end of each of the first and second draft links forms an angle with the first pivot connector at the second end of each respective first and second draft link through the second pivot connector at the second end of each respective first and second draft link, the angle of the first draft link pivot connectors being different from the angle of the second draft link pivot connectors.

13. The three point hitch of claim 11 wherein:
the second pivot connector of the first draft link is located at the second end at least essentially along a central longitudinal axis of the first draft link; and the first pivot connector at the second end of the first draft link is located generally adjacent said second pivot connector of the first draft link, so as to minimize maximum bending moment on the first draft link at the second end from the first and second pivot connectors.

14. In a three point hitch including an upper link, a first draft link below and to one lateral side of the upper link and a second draft link below and to an another lateral side of the upper link opposite the one lateral side, the improvement wherein
the first draft link including a cylinder of adjustable length and the second draft link is a rigid structure of fixed length having a higher bending strength than the cylinder, the first and second draft links having pivotal connections at first sides about a common horizontal axis for connection to the vehicle; the draft links having on the opposing end attachment plate structures each having separate first and second pairs of pivotal connector, the first connectors of each pair configured for pivotal attachment to a load and the second connectors of each pair configured for attachment to draft links.

15. In the three point hitch of claim 14 wherein each of the upper, the first draft and the second draft links includes a first pivot connector at a first longitudinal end configured for pivotal attachment with a work vehicle and a second pivot connector at a second longitudinal end configured for pivotal attachment with a load to be moved by the work vehicle, the improvement wherein the first draft link has a minimum adjustable length between the first and second pivot connectors equal to a fixed length between the first and second pivot connectors of the second draft link.

16. A method of improving the versatility of a three point hitch adapted for adjustably coupling a load with a work vehicle, the three point hitch including an upper link configured for pivotal connection between the vehicle and the load, comprising the steps of:
providing a first draft link of adjustable length below the upper link on a first lateral side of the upper link and having a pivot connector at a first end configured for pivotal connection with the vehicle and a second pivot connector at a second end configured for pivotal connection with the load; while
providing a second draft link plate of fixed length having a higher bending strength than the first draft link, below the upper link on a second lateral side of the upper link opposite the first lateral side and having a pivot connector at a first end configured for pivotal connection with the vehicle and a second pivot connector at a second end configured for pivotal connection with the load, wherein a generally vertical axis, passing through the pivot connector on the second draft link plate serves as a pivot axis for the load.

17. The method of claim 16, wherein the first and second draft links are connected to a scraper, the adjustable draft link adjusting the yaw of the scraper by pivoting the scraper about the generally vertical axis, passing through the pivot connector on the second draft link plate mounting the scrapper to the second draft link.

* * * * *